(12) United States Patent
Jordan

(10) Patent No.: US 7,714,769 B2
(45) Date of Patent: May 11, 2010

(54) METHOD FOR ESTIMATING THE WIDTH OF RADAR OBJECTS

(75) Inventor: Ruediger Jordan, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/272,342

(22) Filed: Nov. 17, 2008

(65) Prior Publication Data

US 2009/0135048 A1 May 28, 2009

(30) Foreign Application Priority Data

Nov. 16, 2007 (DE) .................. 10 2007 054 821

(51) Int. Cl.
*G01S 13/93* (2006.01)
(52) U.S. Cl. ............... 342/70; 342/71; 342/107; 342/108; 342/109; 342/133; 342/139; 342/146; 342/147; 340/435; 340/436; 340/903
(58) Field of Classification Search ............ 342/70–72, 342/107–109, 133, 139–141, 145–147; 701/301; 340/435, 436, 903
See application file for complete search history.

(56) References Cited

U.S. PATENT DOCUMENTS 6,593,873 B2 * 7/2003 Samukawa et al. ............ 342/70
7,496,449 B2 * 2/2009 Samukawa et al. .......... 701/301
2002/0032515 A1 * 3/2002 Nakamura et al. ............ 701/96
2004/0117115 A1 * 6/2004 Zimmermann et al. ...... 701/300
2004/0140927 A1 * 7/2004 Meinecke et al. ............. 342/70
2005/0225744 A1 10/2005 Samukawa et al.
2005/0232463 A1 * 10/2005 Hirvonen et al. ............ 382/103
2008/0065328 A1 * 3/2008 Eidehall et al. ............. 701/301

FOREIGN PATENT DOCUMENTS

| DE | 19959398 | 6/2000 |
|---|---|---|
| DE | 101 60 299 | 6/2003 |
| DE | 102 60 855 | 7/2004 |
| DE | 103 36 638 | 2/2005 |
| EP | 0935143 | 8/1999 |
| JP | 2007147532 | 6/2007 |
| WO | WO 03/050562 | 6/2003 |

* cited by examiner

*Primary Examiner*—John B Sotomayor
(74) *Attorney, Agent, or Firm*—Kenyon & Kenyon LLP

(57) ABSTRACT

In a method for estimating the width of radar objects in a position finding system for motor vehicles, which has at least two angle-resolving radar sensors, the reflection points positioned by several of the radar sensors, which are to be assigned to the same object on the basis of their distance data and relative velocity data, are combined into a group, lateral positions of the reflection points from this group are calculated, the difference of the lateral positions is calculated for various pairs of these refection points, and the maximum of these differences is sought out to determine an estimated value for a minimum width of the object.

7 Claims, 4 Drawing Sheets

METHOD FOR ESTIMATING THE WIDTH OF RADAR OBJECTS

FIELD OF THE INVENTION

The present invention relates to a method for estimating the width of radar objects in a position finding system for motor vehicles, which has at least two angle-resolving radar sensors.

BACKGROUND INFORMATION

Radar-based position finding systems are frequently used in motor vehicles in connection with driver assistance systems, for example in so-called ACC (adaptive cruise control) systems, which allow automatic distance regulation to a preceding vehicle, or in predictive safety systems (PSS), which are used for the purpose of recognizing an imminent collision and initiating automatic measures to avoid the collision and/or at least mitigating the consequences of the collision.

The radar sensors used are typically long-range, both distance-resolving and also angle-resolving radar sensors (LRR; long-range radar), which operate at a frequency of approximately 76 GHz, or distance-resolving short range sensors (SRR; short range radar), which operate at a frequency in the range of approximately 24 GHz, or combinations of these two sensor types. Using two LRR sensors, whose position finding directions deviate from the longitudinal axis of the vehicle towards opposite sides, so that the left and right roadway edges may be monitored better and a higher position finding frequency is achieved in the overlap area on the roadway, has also been suggested.

The angle-resolving LRR sensors deliver information about the distance and the relative velocity of the positioned objects and about their azimuth angle, from which, on the basis of the distance, the approximate lateral position of the object, i.e., its location in the direction transverse to the longitudinal axis of the vehicle, may then be calculated.

For various assistance functions, it would also be desirable to have information available about the approximate width of the positioned objects, so that, for example, in a PSS system it may be better decided whether or not it is possible to drive around the object.

In the typical position finding systems, such a width estimation is not possible with satisfactory precision, however, not even if the position finding system has an angle-resolving LRR sensor. One significant reason for this is that the radar signal reflected from an object, for example the rear of a preceding vehicle, is not received uniformly from all points distributed over the width of the object, but rather is localized on one or a few reflection points, at which the perpendicular of incidence of the reflecting surface is coincident with the line of sight of the radar sensor. Depending on the spatial relationship between the radar sensor and the object, the (main) reflection point may "jump" unpredictably between various points on the rear of the object, which also restricts the precision and reliability when determining the lateral position of the object.

German Patent No. DE 103 36 638 describes a driver assistance system for motor vehicles, in which the positioned objects are classified according to their estimated width. However, no special method is specified for estimating object width.

Radar-based position finding systems having multiple 24 GHz sensors are described in German Patent Nos. DE 101 60 299 and DE 102 60 855, in which the width of the objects is estimated on the basis of characteristic patterns in the distance data measured by the various sensors. Inter alia, the circumstance is exploited that in the case of a broad, flat rear, for example, of a truck, all radar sensors situated adjacent to one another measure essentially the same distance, while the distance data of the various sensors are distributed in a characteristic way in the event of one or more localized objects.

SUMMARY OF THE INVENTION

An object of the present invention is to provide a method which allows an improved width estimation with the aid of at least two angle-resolving radar sensors.

This object is achieved according to the present invention in that the reflection points located by a plurality of the radar sensors, which are to be assigned to the same object on the basis of their distance data and relative velocity data, are combined into a group, lateral positions of the reflection points are calculated from this group, the difference between the lateral positions is calculated for various pairs of these reflection points, and the maximum of these differences is sought out to determine an estimated value for a minimum width of the object.

The present invention is essentially based on the consideration that the precise location of a reflection point on the rear of an object is relatively sensitively dependent on the spatial relationship between this object and the radar sensor, using which this reflection point is located. If at least two radar sensors are provided, the various sensors will therefore "see" different reflection points of the object, and the locations of these reflection points in relation to the object will differ more strongly the further the sensors are spaced apart from one another in the transverse direction of the vehicle.

If, due to the similarity of the distances and the approximate identity of the relative velocities, it is established that the located reflection points belong to the same object, the actual width of the object is thus greater than the maximum distance between two arbitrary reflection points in any case. The advantage of the method according to the present invention is therefore that the group of the reflection points whose lateral positions are compared to one another also includes those pairs of reflection points which were detected by different sensors and in which the chance is therefore especially great that they have a relatively great lateral distance to each other at the object. A high probability therefore exists that the estimated value obtained in this way for the minimum width of the object is close to the real object width. This extra information will often represent a decisive advantage for the assistance functions to be executed on the basis of the position finding data, for example, for the decision as to whether a collision will occur with the object or it is still possible to avoid it.

It is additionally advantageous that the method according to the present invention may be executed using existing sensor technology (using typical LRR sensors), without any noteworthy modifications having to be performed on the hardware.

Of course, it is expedient in the scope of the present invention if the two angle-resolving radar sensors have the greatest possible lateral distance to each other, i.e., are located as close as possible to the left and right front corners of the vehicle, for example, which also has the advantage that obstructions may still be located by at least one of the radar sensors even if they only are at a small distance from the host vehicle and enter the driving corridor of this vehicle from the left or right side.

A significant improvement of the precision of the method according to the present invention may be achieved if, as is typical in radar position finding systems known per se, the positions of the objects are tracked from measuring cycle to measuring cycle in a so-called tracking procedure. If the lateral position of the tracked object shifts in the course of time in relation to the host vehicle, a corresponding displacement of the reflection points on this object also results. The probability that the real width of the object will be approximated more closely thus rises if the differences of the lateral positions are tracked over multiple measurement cycles to estimate the object width. Various known algorithms may be used for the calculation of the estimated value, e.g., maximum and low-pass filter, median filter, histogram method, and the like. Thus, for example, in the histogram method, a certain frequency distribution of the measured values for the differences is obtained, and the best estimated value for the minimum width of the object will then be at a maximum of the frequency distribution and, if there are multiple maxima, at the maximum corresponding to the greatest difference.

A still more precise width estimation is made possible if one searches for characteristic patterns in the time changes of the lateral positions of the reflection points over time. For example, a reflection point which lies on an approximately flat surface oriented transversely to the travel direction will be relatively stable in regard to time, even if the lateral positions of the vehicle and the object shift in relation to one another. A reflection point which originates from a more strongly curved structure of the object, for example from a rear corner of a vehicle body, in contrast, will display stronger fluctuations over time and thus allow the location of the lateral delimitation of the object to be determined more precisely.

In general, one advantage of the present invention is that the method not only allows an estimation of the width of the object, but rather also specifies the lateral positions of the located reflection points in relation to the host vehicle at the same time. This information is particularly valuable for numerous assistance functions because it permits conclusions about the lateral positions of the left and right delimitations of the object.

For example, in an ACC system, an important object is to recognize vehicles cutting in, i.e., preceding vehicles which change from an adjacent lane to the host vehicle's lane, as well as vehicles veering out, which change from the host vehicle's lane to an adjacent lane, as early as possible. If multiple reflection points of the preceding vehicle may be tracked with the aid of the at least two radar sensors, the real location and extension, transverse to the travel direction, of this vehicle may be determined significantly more reliably than if only one reflection point was available, of which one does not know if it originates from the left or right corner of the vehicle, for example. The more precise information about the lateral location and extension of the preceding vehicle allows merging and veering procedures to be recognized already as they begin.

DETAILED DESCRIPTION

Figure 1:
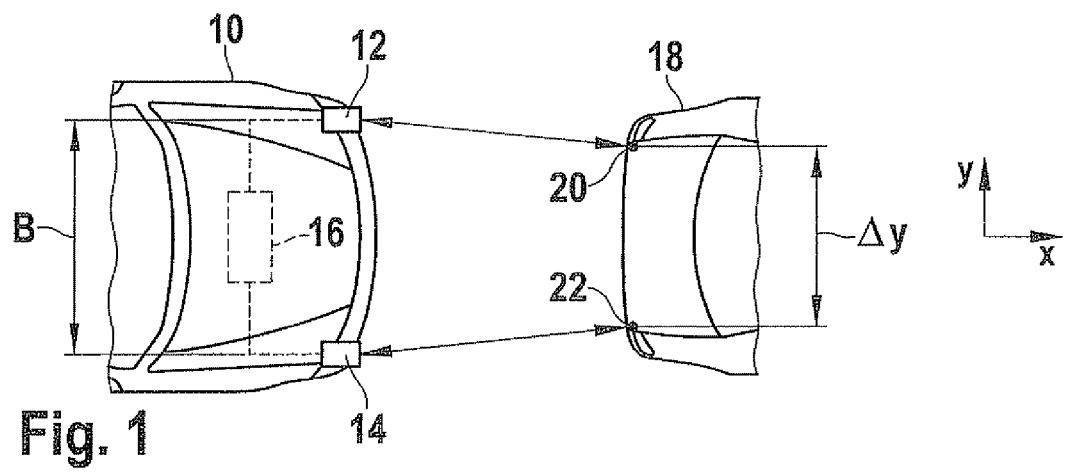
FIGS. 1 through 6 show sketches of a front part of a motor vehicle and a preceding vehicle, to explain the basic principle of the present invention for different spatial configurations of the vehicles.

The front part of a motor vehicle 10, which is equipped with a driver assistance system, is shown schematically and in top view in FIG. 1. Important components of this driver assistance system are two angle-resolving radar sensors 12, 14, such as 76 GHz LRR sensors, and an electronic data processing system 16, which evaluates the position finding data of the radar sensors.

Furthermore, the top view of an object 18 is shown in FIG. 1, in this example the rear of a preceding passenger automobile. This object 18 is located by both radar sensors 12 and 14. The corresponding radar beams are shown in FIG. 1 by arrows and run from particular radar sensor 12 or 14 to a reflection point 20 or 22, respectively, are reflected there and run back to the radar sensor from which they were emitted. The location of reflection points 20, 22 on object 18 is therefore a function of the contour of object 18—which is slightly curved in the example shown—and characterized by the condition that the perpendicular of incidence of the radar beams on the reflection point is coincident with the line of sight between this reflection point and the associated radar sensor.

An x-y coordinate system in FIG. 1 provides the x direction running in the travel direction, i.e., in the direction of the longitudinal axis of vehicle 10, and the y direction running perpendicularly thereto. Both radar sensors 12 and 14 are situated in such a way that they have the greatest possible distance from one another in the y direction, i.e., they are located in proximity of the left or right front corner of vehicle 10. Correspondingly, reflection points 20 and 22 also lie relatively far apart from one another on the object in the y direction, in particular in the event of a relatively small distance of object 18. The locations of associated reflection points 20, 22 in the x-y coordinate system may be calculated from the distances and azimuth angles of these reflection points measured by radar sensors 12 and 14, i.e., in particular also the lateral positions of these reflection points, i.e., the positions on the y axis (y=0 corresponds to the center of vehicle 10).

It must first be established in data processing system 16 whether located reflection points 20, 22 belong to the same object 18 or possibly to two different objects. A suitable criterion for this decision is that the measured distances of the reflection points are not to differ too greatly from one another and, in addition, the associated relative velocities (which may be measured directly with the aid of the radar sensors) are to essentially correspond. If this criterion is fulfilled, it may be concluded that the width of object 18 is at least equal to difference $\Delta y$ between the lateral positions of reflection points 20 and 22.

In this way, the precise width of object 18 is not obtained, but rather a quite informative estimated value for the minimum width is obtained nonetheless. If the minimum width thus obtained is greater than the typical width of a bicycle, for example, the information is obtained that object 18 is not a bicycle, so that the real width of object 18 will either be the typical width of a passenger automobile or the typical width of a truck.

Figure 2:
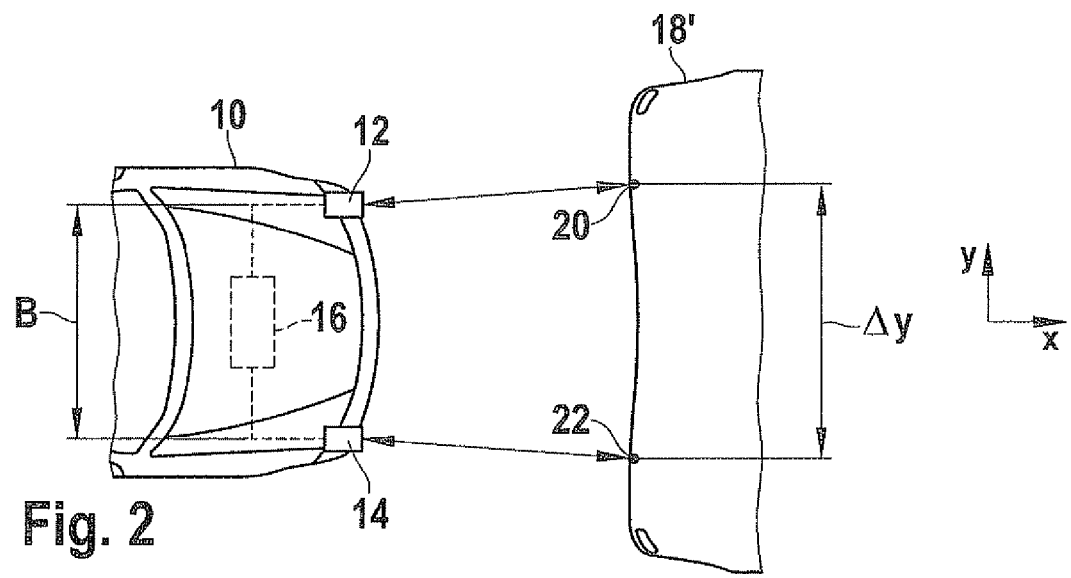

Further valuable information is obtained from the fact that in FIG. 1 difference $\Delta y$ is positive, but it is less than base width B, i.e., the lateral distance between radar sensors 12 and 14. As is apparent from FIG. 1, it may be concluded therefrom that the rear of object 18 is convexly curved. For comparison, FIG. 2 shows a concavely curved rear of a wider object 18', for example, of a truck. In this case, $\Delta y$ is greater than B. Special case $\Delta y$ B would correspond to a completely flat rear of a wide object oriented exactly in the y direction, as is frequently encountered on a truck. On the basis of these considerations, object 18 may therefore be classified as a passenger automobile and object 18' as a truck, so that the known standard widths of these vehicle types may be used for the width estimation.

Figure 3:
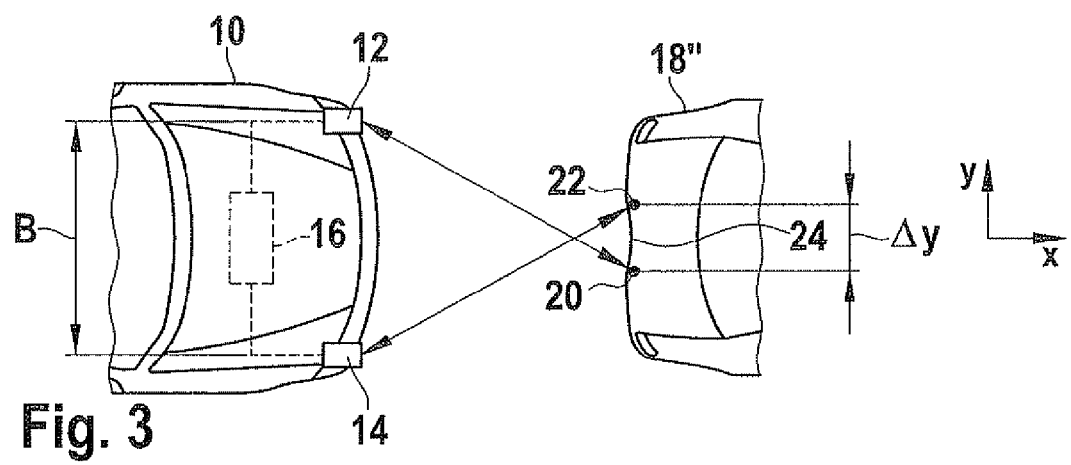

As FIG. 3 illustrates, negative values of Δy are also possible. These indicate an object 18" whose rear has a concave structure 24 having a width that is less than base width B. For example, structure 24 may be a slight trough in the rear of a passenger automobile, in which the license plate is typically attached.

Reflection points which characterize such concave structures 24 will typically not deliver the strongest radar echoes, however, and will therefore generally only occur in addition to the main reflection points, which approximately correspond to the configuration according to FIG. 1. In this way, the affected object may be identified as a passenger automobile, and if the absolute value of negative difference Δy corresponds to the typical width of a license plate, it may additionally be assumed that the location of reflection points 20 and 22 in FIG. 3 specifies the lateral position of the middle of object 18", because the license plate is normally located in the middle of the rear on a passenger automobile. Because the typical width of a passenger automobile is known, relatively exact information about the y positions of the left and right boundaries of the positioned object is thus obtained overall.

Figure 4:
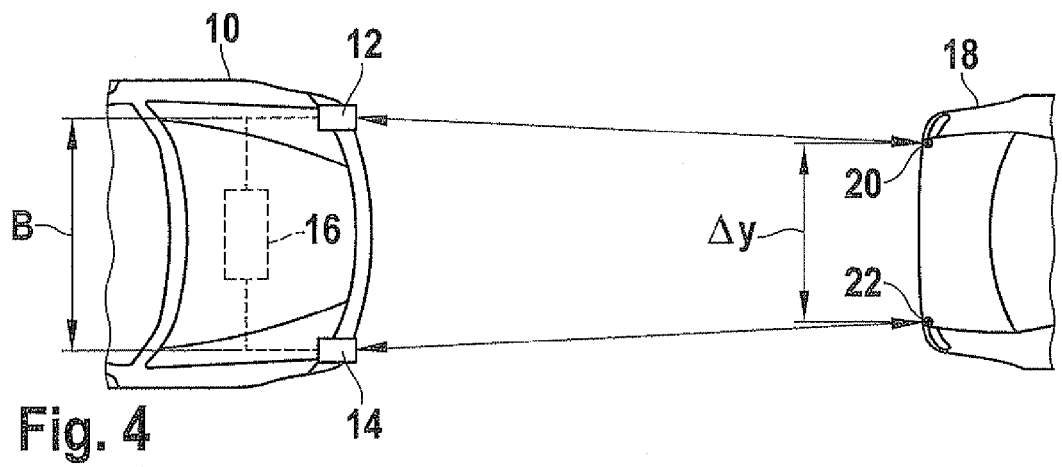

FIG. 4 again shows a similar configuration as in FIG. 1, but with the difference that object 18 now has a greater distance from vehicle 10. Because of the convex contour of object 18, this has the result that reflection points 20 and 22 now lie closer to one another, so that difference Δy of their lateral positions now results in a worse estimated value for the width of object 18. In most practical cases which occur in the scope of an assistance function, for example in the evaluation of a collision danger, the precise knowledge of the width of an object and the knowledge of the location of the left and right delimitations of this object are particularly important just when the distance of the object has already decreased to relatively small values, however. The width estimation according to the method according to the present invention therefore has the advantage that its quality improves to the degree to which the importance of the estimated value increases.

If the movement of object 18 in relation to vehicle 10 is additionally tracked over a longer period of time in the scope of a tracking procedure, for example during the gradual approach before a collision, it may be observed that reflection points 20 and 22 travel apart from one another. This again indicates a convex contour of the rear of the object and thus a passenger automobile.

Figure 5:
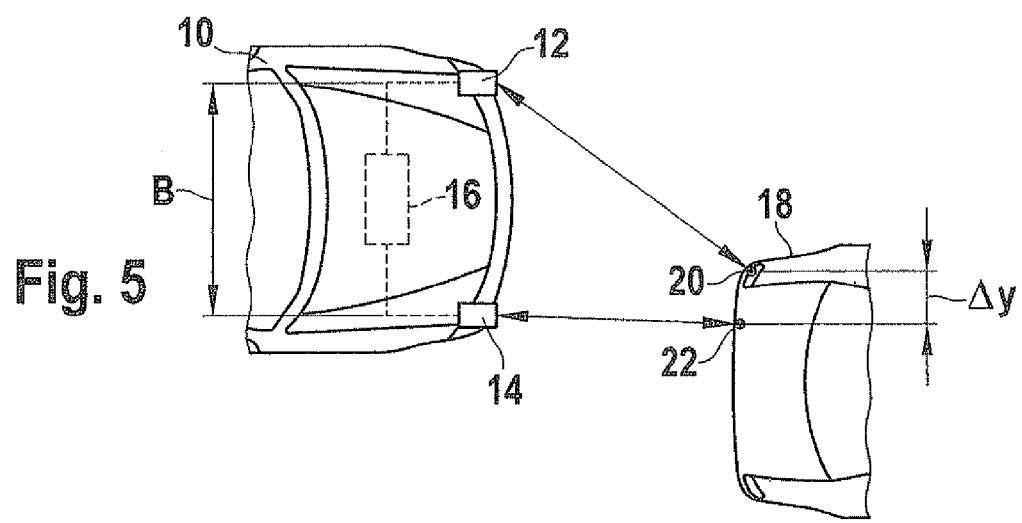
Figure 6:
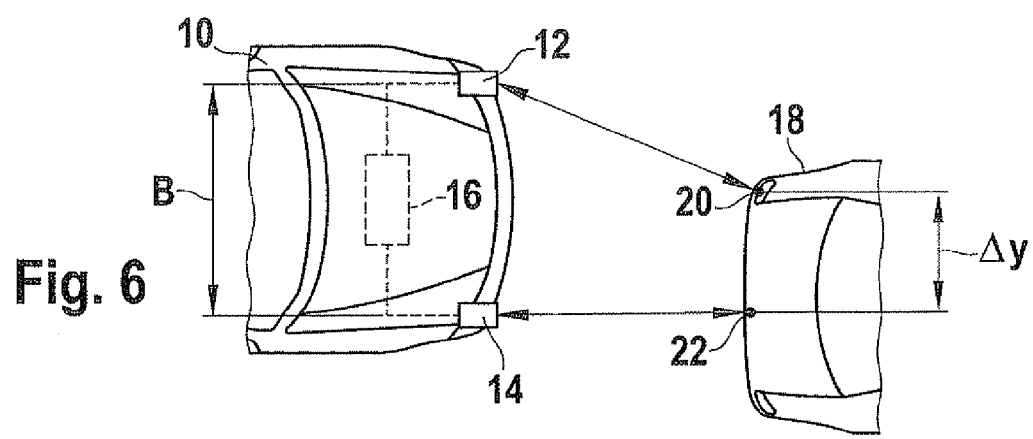

FIGS. 5 and 6 illustrate the effect of a lateral offset of object 18 in relation to vehicle 10. In such a configuration, one of the reflection points, reflection point 20 in FIG. 5, will originate from one corner of object 18, while other reflection point 22 originates from an essentially flat central area of the rear of the object. As a comparison of FIGS. 5 and 6 shows, reflection point 20 on the corner reacts significantly more sensitively to lateral movements of object 18 than more central reflection point 22. In the event of a strong lateral offset, as in FIG. 5, difference Δy is significantly less than the real width of the object. The further object 18 moves into the travel corridor of vehicle 10, however, the better the width estimation on the basis of difference Δy of the lateral positions of reflection points 20, 22 (FIG. 6).

A further significant improvement of the width estimation may be achieved in that object 18 is tracked over a longer period of time in the scope of the tracking procedure, the width estimation being continuously improved. In a typical driving situation, object 18, a preceding vehicle, which is followed by vehicle 10, will "oscillate" somewhat around the central axis of vehicle 10, so that it is detected by radar sensors 12, 14 at different viewing angles. This may be used for the purpose of gradually improving the width estimation, so that when the information about the width of the object is required in the event of an imminent collision, relatively reliable data already exist.

Figure 7:
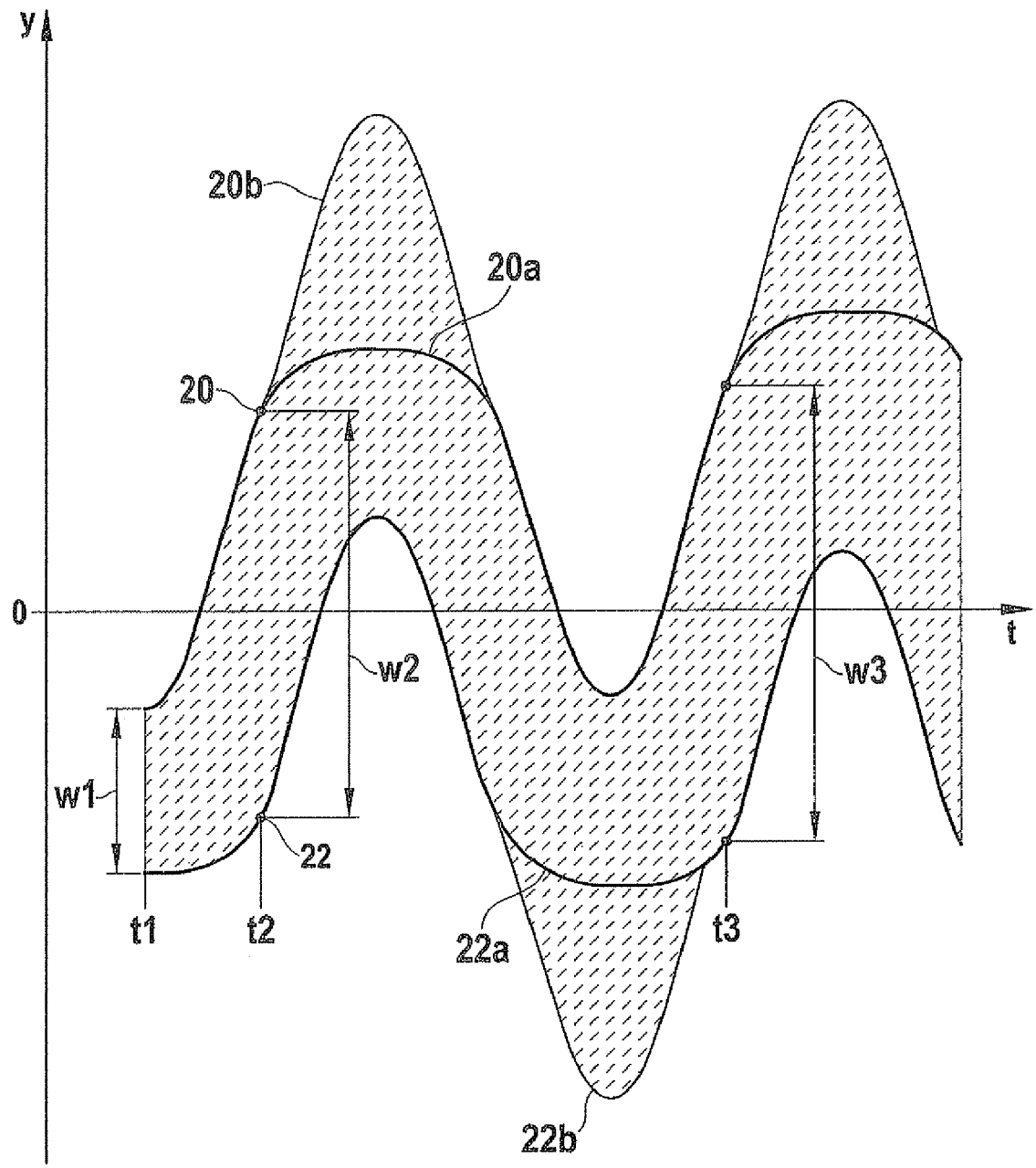
FIG. 7 shows a time diagram for a method to estimate the lateral extension of an object.

FIG. 7 shows a time diagram for such a tracking procedure. Lateral positions y of the left and right reflection points are plotted against time t here and are represented by bold curves 20a and 22a. Position y=0 corresponds to the central axis of vehicle 10.

At point in time t1, the preceding vehicle, object 18, travels offset strongly to the right, similarly as in FIG. 5, and the width estimation results in value w1.

Object 18 then moves to the left in relation to vehicle 10, which, because of the effect illustrated in FIG. 6, results in an increase of difference Δy between the lateral positions of the reflection points. At point in time t2, the configuration according to FIG. 1 is reached, in which reflection points 20a and 22a lie symmetrically to position y =0 and difference Δy already comes relatively close to the real width of object 18. In this situation, the width estimation delivers value w2.

If object 18 now moves further to the left, the difference between the positions of reflection points 20 and 22 decreases again. However, because it is already known that the width of the object is at least w2, and because it may be additionally assumed that right reflection point 22 will lie in the proximity of the right boundary of the object, the true left delimitation of object 18 must lie left of the position of reflection point 22 by at least w2, as specified by curve 20b in FIG. 7. In this way, a relatively realistic estimation for the lateral extension and position of object 18 is obtained, i.e., for the area occupied at least by object 18, which is shown shaded in FIG. 7.

In its further course, object 18 moves to the right again, so that curve 20b again reaches curve 20a. From this moment on, the value given by curve 20a is again assumed as the estimated value for the left boundary of the object, and an estimation of the position of the right boundary is again obtained on the basis of the assumption that the width of the object is at least w2 and the object extends outward to the right from reflection point 20. The estimated value for the right boundary of the object is then given by curve 22b.

If object 18 then moves to the left again, curve 22b also falls back to curve 22a, and from this moment on, the estimated value for the right boundary of the object is again given by curve 22a. In the example shown, however, difference Δy has not yet reached its maximum again in this instant, but rather this difference grows further, for example, because the distance between object 18 and vehicle 10 has decreased in the meantime. Difference Δy reaches a new maximum only at point in time t3, whereby an improved width estimation w3 results, using which the procedure described above may then be repeated.

Figure 8:
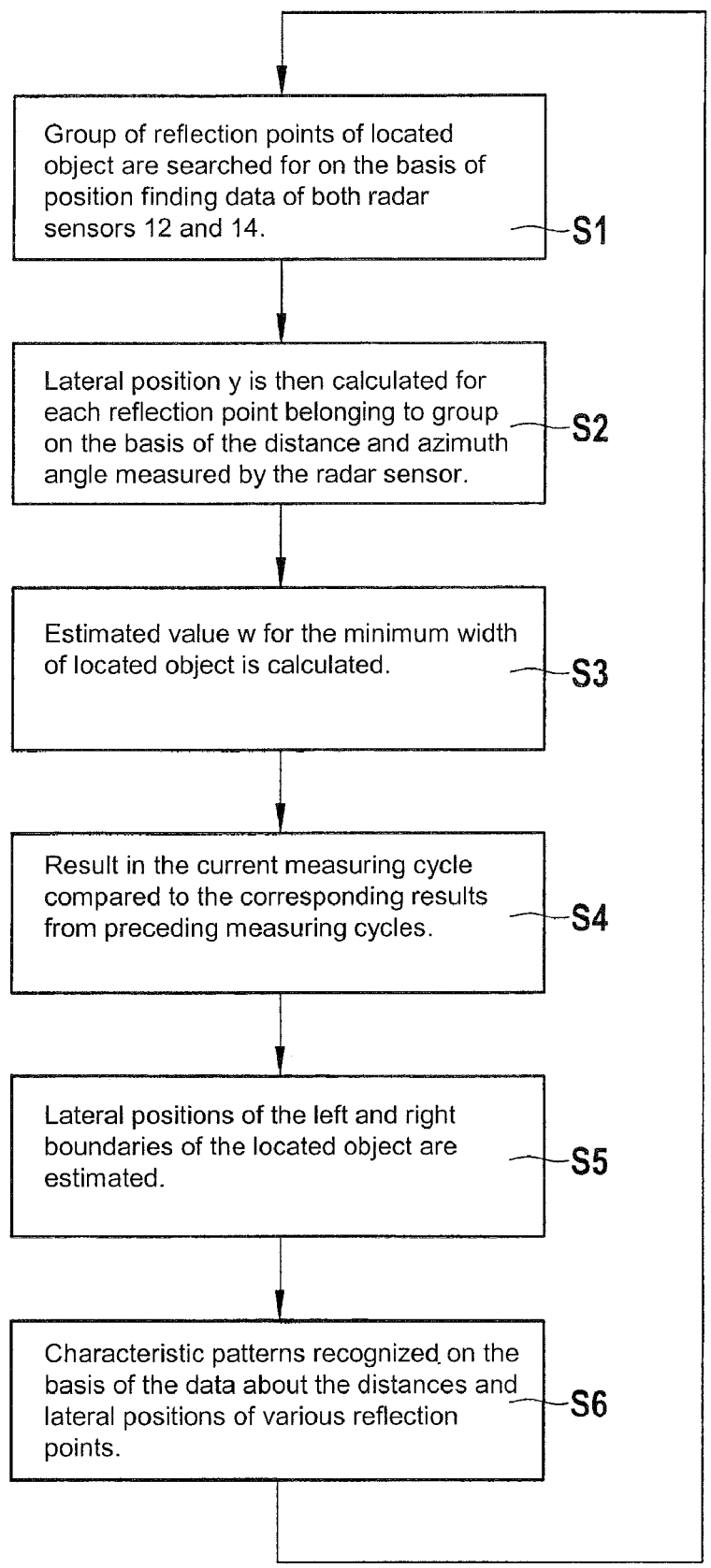
FIG. 8 shows a flow chart to illustrate the method according to the present invention.

The important steps of the method for estimating the positions of the left and right boundaries of the located object are once again shown as a flow chart in FIG. 8.

In step S1, groups of reflection points, which essentially have equal relative velocity and also approximately equal distance, are searched for on the basis of the position finding data of both radar sensors 12 and 14. The assumption behind this is that the group of the reflection points which meet these criteria are to be assigned to the same object.

In step S2, lateral position y is then calculated for each reflection point belonging to this group on the basis of the distance and azimuth angle measured by the radar sensor. If more than one object is located, this step is executed separately for each group of reflection points and thus for each object. A group may also contain more than two reflection points, because it is possible that on the basis of a special contour of the object, radar signals of multiple reflection points are reflected again in the same radar sensor.

According to a refinement of the present invention, it is also possible to analyze radar signals which are transmitted by left radar sensor 12 and are received by right radar sensor 14 after reflection, and vice versa. This results in additional reflection points which will generally lie between reflection points 20 and 22 and allow the contour of the object to be imaged even more precisely.

On the other hand, a group may only contain a single reflection point. This will generally be the case if the object is no longer located in the overlapping position finding areas of both radar sensors, but rather has left the position finding area of one sensor.

An estimated value w for the minimum width of this object is then calculated for each object in step S3, in that the maximum of differences Δy of the lateral positions is searched out for all pairs of reflection points within this group. This search is not restricted to pairs in which one reflection point is located by the left sensor and the other by the right sensor, but rather also includes, if present, pairs of reflection points which are located by the same radar sensor. The lateral distance between the reflection points of such a pair also delivers a minimum value for the object width.

The result obtained in the current measuring cycle in step 3 is then compared to the corresponding results from preceding measuring cycles (tracking) in step S4, and if necessary the present estimated value for the object width is corrected in a filtering procedure, e.g., maximum and low-pass filtering.

In step S5, the lateral positions of the left and right boundaries of the object are then estimated according to the procedure illustrated in FIG. 7.

A step S6 may optionally follow, in that characteristic patterns are recognized on the basis of the data about the distances and lateral positions of the various reflection points, for example convex, concave, or flat rears of the object, signatures of license plates, and the like which allow a classification of the object as a bicycle, passenger automobile, or truck and thus an improvement of the width estimation on the basis of known standard widths of these vehicle types.

The procedure described above is subsequently repeated for the next measurement cycle. If one of two reflection points 20, 22 is lost in a measuring cycle for an object, for example because the object has partially moved out of the location area of one of the sensors, during tracking, the previous width estimation for this object may be maintained and updated again later, as soon as the second reflection point is located again.

What is claimed is:

1. A method for estimating a width of radar objects in a position finding system for a motor vehicle, which has at least two angle-resolving radar sensors, the method comprising:
    combining into a group reflection points located by a plurality of the radar sensors, which are to be assigned to the same object on the basis of distance data and relative velocity data;
    calculating lateral positions of the reflection points from the group;
    calculating a difference of the lateral positions for various pairs of the reflection points; and
    determining a maximum of the differences to determine an estimated value for a minimum width of the object.

2. The method according to claim 1, further comprising:
    tracking the objects in a tracking procedure; and
    replacing a previous estimated value by a more recent estimated value, if the more recent estimated value is greater than the previous estimated value.

3. The method according to claim 1, further comprising:
    calculating estimated values for the lateral positions of left and right boundaries of the object on the basis of the lateral positions of the reflection points and on the basis of the estimated value for the minimum width of the object.

4. The method according to claim 1, further comprising performing a pattern recognition step, in which the positioned objects are classified on the basis of a recognition of characteristic patterns in the lateral positions of the reflection points.

5. A driver assistance system for a motor vehicle, comprising:
    at least two angle-resolving radar sensors; and
    an electronic data processing system for analyzing data of the radar sensors, the data processing system performing the following:
    combining into a group reflection points located by a plurality of the radar sensors, which are to be assigned to the same object on the basis of distance data and relative velocity data,
    calculating lateral positions of the reflection points from the group,
    calculating a difference of the lateral positions for various pairs of the reflection points, and
    determining a maximum of the differences to determine an estimated value for a minimum width of the object.

6. The driver assistance system according to claim 5, wherein the radar sensors are LRR sensors.

7. The driver assistance system according to claim 5, wherein the at least two radar sensors are mounted in proximity to left and right front corners of the vehicle.

\* \* \* \* \*